(12) United States Patent
Takemura (10) Patent No.: US 10,325,353 B2
(45) Date of Patent: Jun. 18, 2019

(54) IMAGE PROCESSING APPARATUS (71) Applicant: KYOCERA Document Solutions Inc., Osaka (JP)

(72) Inventor: Masataka Takemura, Osaka (JP)

(73) Assignee: Kyocera Document Solutions, Inc. (JP)

( * ) Notice: Subject to any disclaimer, the term of this patent is extended or adjusted under 35 U.S.C. 154(b) by 303 days.

(21) Appl. No.: 15/280,385

(22) Filed: Sep. 29, 2016

(65) Prior Publication Data
US 2017/0098297 A1 Apr. 6, 2017

(30) Foreign Application Priority Data

Oct. 1, 2015 (JP) ................................ 2015-196272

(51) Int. Cl.
*G06T 3/60* (2006.01)
*G06K 9/62* (2006.01)
*G06K 9/52* (2006.01)
*G06T 7/00* (2017.01)
*G06T 7/60* (2017.01)
*G06K 9/32* (2006.01)
*H04N 1/387* (2006.01)

(52) U.S. Cl.
CPC .............. *G06T 3/60* (2013.01); *G06K 9/3275* (2013.01); *G06K 9/52* (2013.01); *G06K 9/6215* (2013.01); *G06T 7/60* (2013.01); *H04N 1/3872* (2013.01); *G06T 2207/20112* (2013.01)

(58) Field of Classification Search
None
See application file for complete search history.

(56) References Cited

U.S. PATENT DOCUMENTS

| 6,111,667 A | 8/2000 | Mishima et al. |
| 6,298,157 B1* | 10/2001 | Wilensky ................ G06T 3/403 382/199 |
| 6,307,963 B1* | 10/2001 | Nishida ................ G06K 9/3241 382/170 |
| 2014/0229426 A1* | 8/2014 | Gootee, III ......... G06F 17/5004 707/608 |
| 2015/0298153 A1* | 10/2015 | Baker ..................... B05B 12/12 438/7 |

FOREIGN PATENT DOCUMENTS

| JP | H09-163121 | 6/1997 |
| JP | 2002-10059 | 1/2002 |
| JP | 2009-164810 | 7/2009 |

* cited by examiner

*Primary Examiner* — Iman K Kholdebarin

(57) ABSTRACT

An image processing apparatus includes an edge detecting unit, a rectangular object detecting unit, and an arrangement processing unit. The edge detecting unit is configured to (a) search each target line in a page image that includes plural rectangular objects for edges of the plural rectangular objects, and (b) detect the edges of the plural objects on the target line on the basis of density variation between pixels in the target line. The rectangular object detecting unit is configured to (a) detect the plural rectangular objects on the basis of the detected edges, and (b) determine respective positions, respective sizes and respective tilt angles of the plural rectangular objects. The arrangement processing unit is configured to rotate areas of the plural rectangular objects specified by the determined positions, the determined sizes and the determined tilted angles by angles corresponding to the tilted angles, respectively.

4 Claims, 9 Drawing Sheets

IMAGE PROCESSING APPARATUS

CROSS-REFERENCE TO RELATED APPLICATIONS

This application relates to and claims priority rights from Japanese Patent Application No. 2015-196272, filed on Oct. 1, 2015, the entire disclosures of which are hereby incorporated by reference herein.

BACKGROUND

1. Field of the Present Disclosure

The present disclosure relates to an image processing apparatus.

2. Description of the Related Art

An image processing apparatus rotates a page image obtained through image scanning and thereby corrects a tilt of the page image.

Although the aforementioned apparatus can correct a tilt of the page image, it is hardly achieved to correct orientations of all of plural objects tilted by respective different tilt angles in a page image to a constant single orientation.

SUMMARY

An image processing apparatus according to an aspect of the present disclosure includes an edge detecting unit, a rectangular object detecting unit, and an arrangement processing unit. The edge detecting unit is configured to (a) search each target line in a page image that includes plural rectangular objects for edges of the plural rectangular objects, and (b) detect the edges of the plural objects on the target line on the basis of density variation between pixels in the target line. The rectangular object detecting unit is configured to (a) detect the plural rectangular objects on the basis of the detected edges, and (b) determine respective positions, respective sizes and respective tilt angles of the plural rectangular objects. The arrangement processing unit is configured to rotate areas of the plural rectangular objects specified by the determined positions, the determined sizes and the determined tilted angles by angles corresponding to the tilted angles, respectively.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
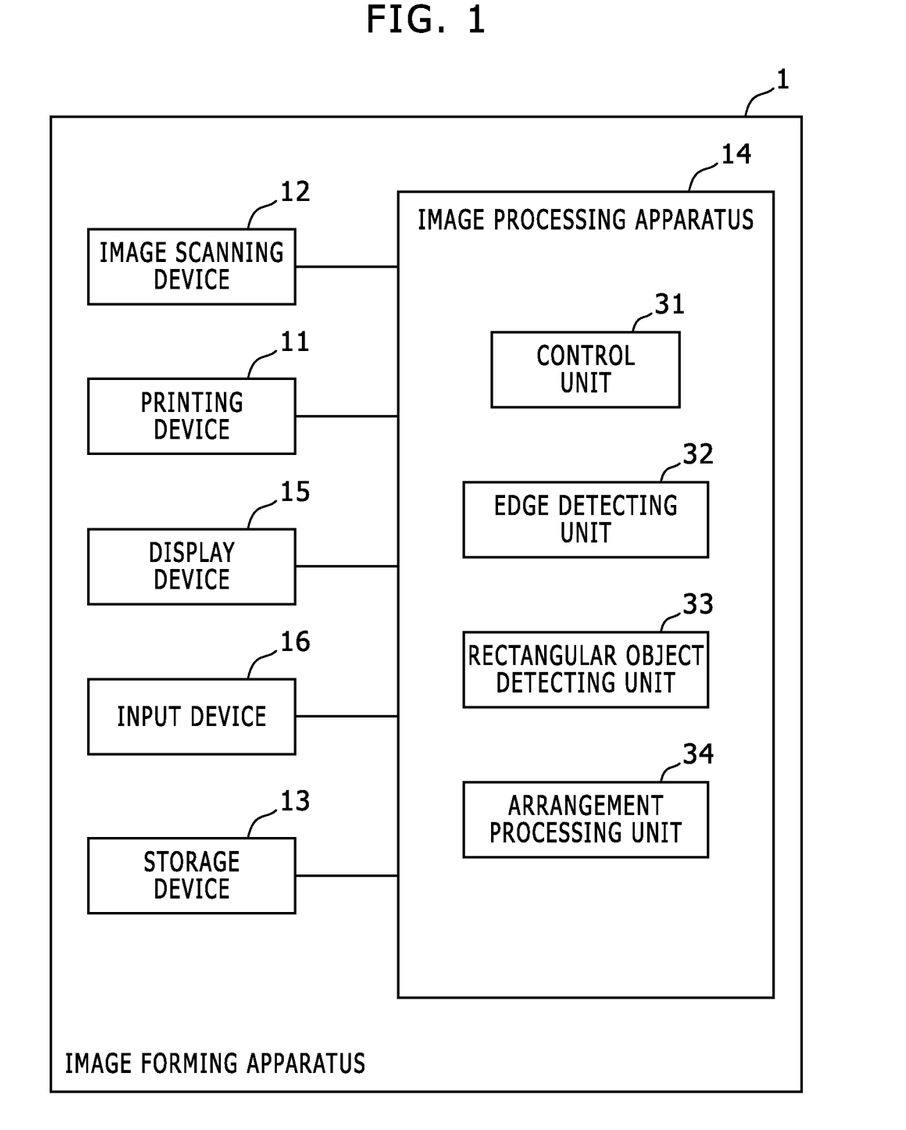
FIG. 1 shows a block diagram that indicates an example of a configuration of an image forming apparatus that includes an image processing apparatus according to an embodiment of the present disclosure.

FIG. 1 shows a block diagram that indicates an example of a configuration of an image forming apparatus that includes an image processing apparatus according to an embodiment of the present disclosure. The image forming apparatus 1 shown in FIG. 1 is a copier, but may be a scanner, a multi function peripheral or the like.

The present image forming apparatus 1 includes a printing device 11, an image scanning device 12, a storage device 13, an image processing apparatus 14, a display device 15, and an input device 16.

The printing device 11 is an internal device that prints a document image based on image data for which sorts of image processing have been performed by the image processing apparatus 14, for example, in an electrophotographic process using toner of CMYK (Cyan, Magenta, Yellow, and Black) colors.

Further, the image scanning device 12 is an internal device that optically scans a document image of a document and generates image data of the document image as RGB data.

Furthermore, the storage device 13 is a non volatile rewritable storage device such as a flash memory and stores sorts of data and programs.

The image processing apparatus 14 performs image processing for image data such as the image data generated by the image scanning device 12. The image processing apparatus 14 is embodied with an ASIC (Application Specific Integrated Circuit), a computer or the like, and includes a control unit 31, an edge detecting unit 32, a rectangular object detecting unit 33, and an arrangement processing unit 34.

The control unit 31 is a processing unit that controls an internal device such as the image scanning device 12, causes the image scanning device 12 to perform scanning a document image, obtains image data of the document image (i.e. a page image with a predetermined size) from the image scanning device 12, and performs image processing for the document image together with the edge detecting unit 32, the rectangular detecting unit 33, and the arrangement processing unit 34.

Here the page image includes plural rectangular objects, and a background of the page image is white (blank). For example, such page image is obtained when scanning plural photographs or plural name cards putted on a platen glass of the image scanning device 12.

For example, the rectangular object is an image scanned from the photograph (i.e. a physical medium with a predetermined size on which a photo image was developed) or the name card.

In the aforementioned page image, the control unit 31 selects target lines in turn line by line or with an interval of the predetermined number of lines, and the edge detecting unit 32 searches each target line for edges of the plural rectangular objects, and detects edges of the plural rectangular objects on the target line on the basis of density variation (e.g. variation of brightness value) between pixels in the target line.

The rectangular object detecting unit 33 (a) detects the plural rectangular objects on the basis of the detected edges, and (b) determines respective positions, respective sizes and respective tilt angles of the plural rectangular objects.

In this embodiment, for each target line in the page image, the rectangular object detecting unit 33 (a) determines the number of the rectangular objects located on the target line on the basis of the number of the detected edges, and determines the rectangular object that includes the edge on the basis of an order of the edges and the positions of the edges, and (b) tries to determine the position, the size and the tilt angle of each one of the rectangular objects on the basis of the positions of the edges included by each one of the rectangular objects.

Figure 2:
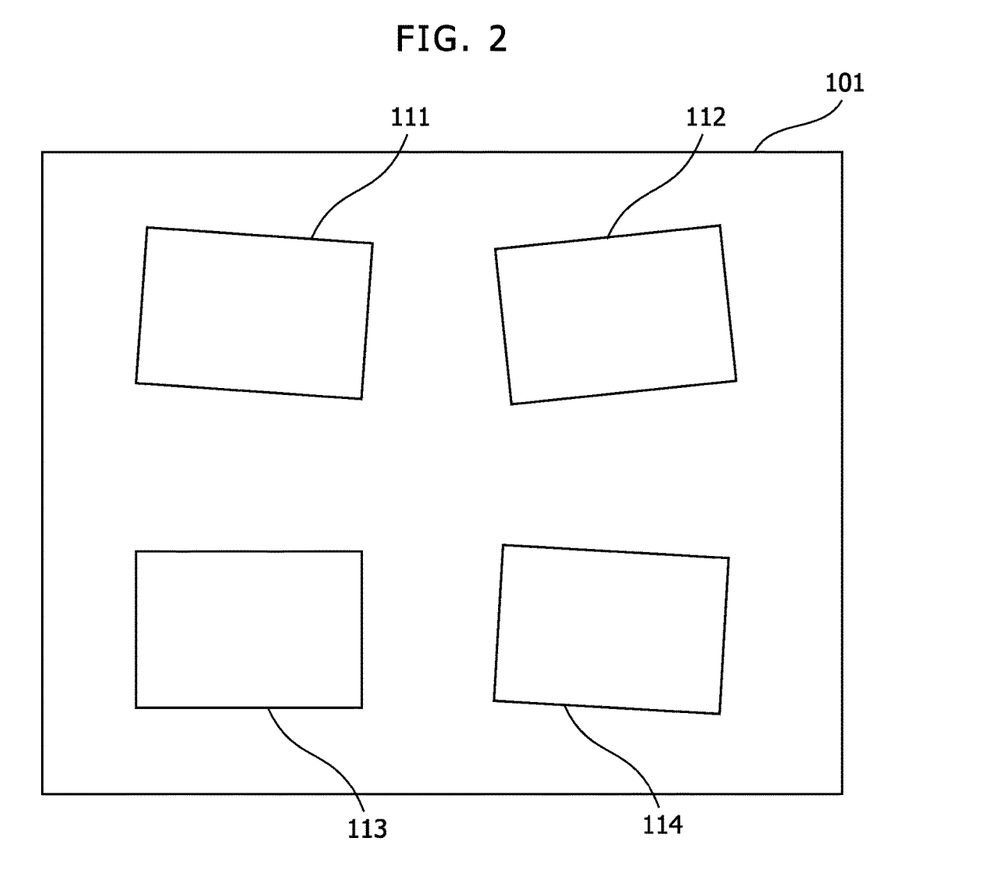
FIG. 2 shows a diagram that indicates an example of a page image.
Figure 3:
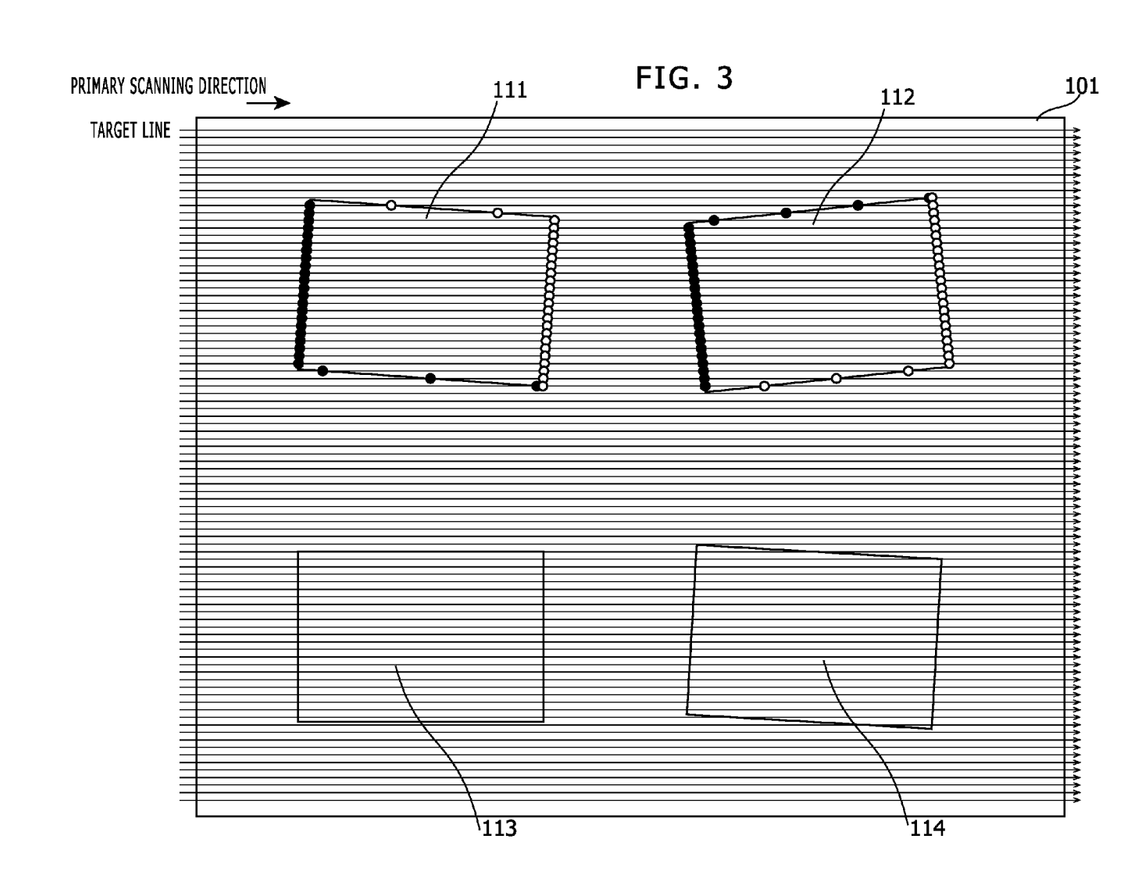
FIG. 3 shows a diagram that explains edges detected in the page image shown in FIG. 2.
Figure 4:
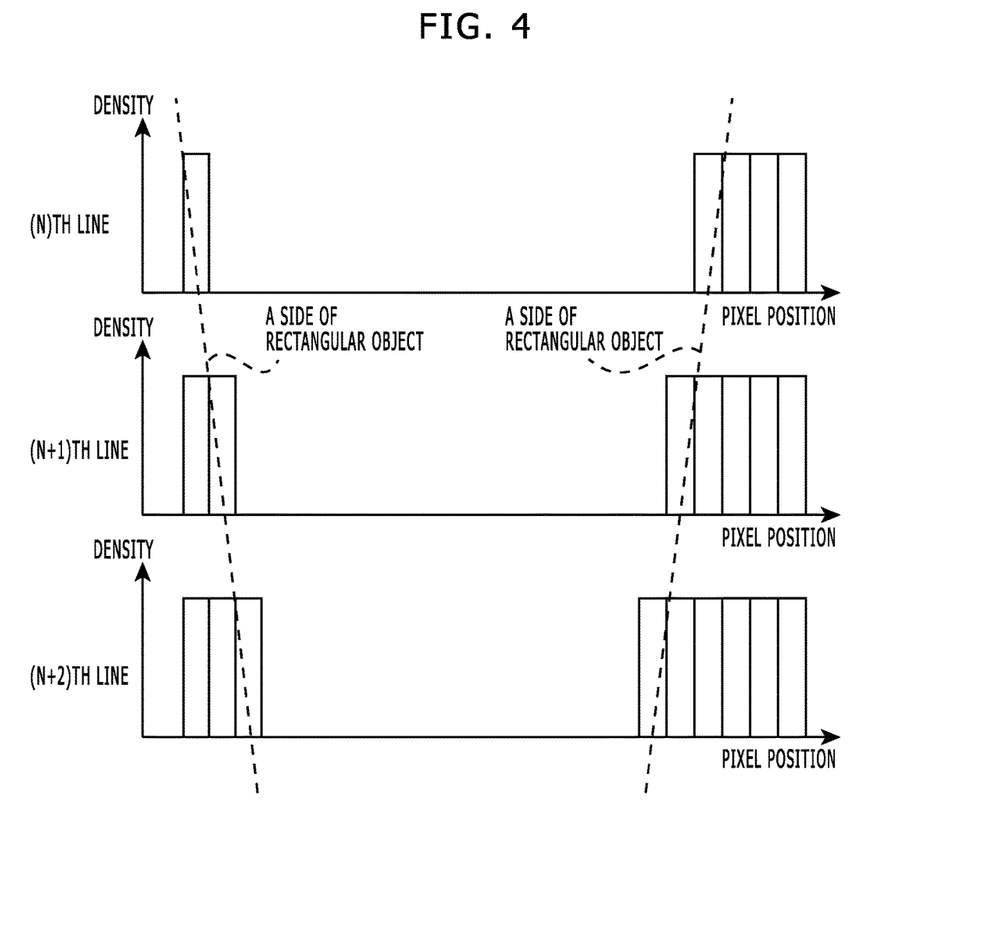
FIG. 4 shows a diagram that indicates an example of sides of rectangular edges detected on the basis of position of the detected edges.

FIG. 2 shows a diagram that indicates an example of a page image. FIG. 3 shows a diagram that explains edges detected in the page image shown in FIG. 2. FIG. 4 shows a diagram that indicates an example of sides of rectangular edges detected on the basis of position of the detected edges.

A page image 101 shown in FIG. 2 includes four rectangular objects 111 to 114 of which two are arranged along a primary scanning direction and two are arranged along a secondary scanning direction.

One target line includes two edges (i.e. a rising edge from a background to a rectangular object and a falling edge from the rectangular object to the background) per rectangular object. In FIG. 3, among edges detected on target lines due to the rectangular object 111 and the rectangular object 112, the rising edges are indicated as black circles and the falling edges are indicated as white circles.

Thus, if the number of rectangular objects detected on the current target line is identical to the number of rectangular objects detected on the previous target line, then the (2×i−1)-th edge and the (2×i)-th edge are included by the i-th rectangular object (i=1, 2, . . . ).

Contrarily, if the number of rectangular objects detected on the current target line is different from the number of rectangular objects detected on the previous target line (i.e. the different number of the edges are detected), then the rectangular object detecting unit 33 (a) estimates positions of edges on the current target line for each rectangular object detected on the previous target line on the basis of positions of edges detected on and until the previous target line, and (b) among edges detected on the current target line, determines respective edges closest to the estimated positions as edges included by the rectangular object. Therefore, if the number of the rectangular objects increases, then it is determined that a residual edge (i.e. an edge not included by the rectangular objects detected on the previous target line) among the detected edges is included by a new rectangular object.

Further, if the number of the detected edges is zero, i.e. the number of the detected rectangular object is zero in the previous target and the number of the detected rectangular objects on the current target line is equal to or larger than 1, then the rectangular object detected on the current target line is identified as another rectangular object than the rectangular object detected on and until the previous target line.

A rectangular object has four sides (i.e. linear edges). Plural edges detected on one side are located in line, and therefore a straight line that passes on the side is determined as shown in FIG. 4 on the basis of positions of at least two of the detected edges. Consequently, for each rectangular object, straight lines that pass the sides of the rectangular object are determined on the basis of edges included by the rectangular object.

An intersection point between the two sides (i.e. an intersection point between a straight line passing on a side and a straight line passing on another side) is a vertex of the rectangular object, and therefore, determining four sides and four vertexes of the rectangular object enables to determine a position, a size and a tilt angle of the rectangular object.

Figure 5:
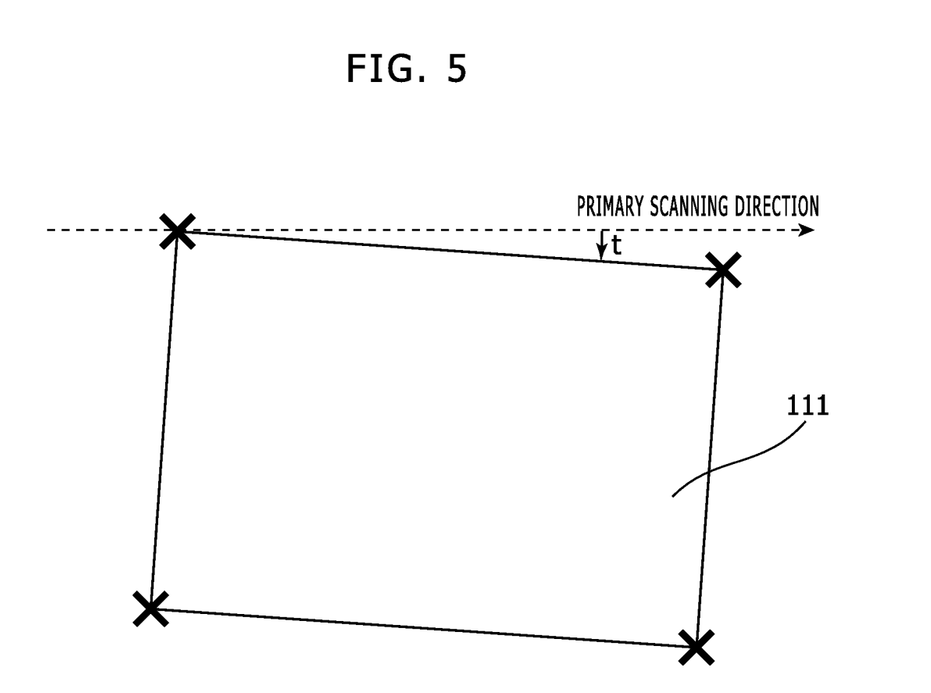
FIG. 5 shows a diagram that explains a tilt angle of a rectangular object.

FIG. 5 shows a diagram that explains a tilt angle of a rectangular object. For example, as shown in FIG. 5, an angle between an upper side of the rectangular object and a primary scanning direction is determined as the tilt angle.

The arrangement processing unit 34 rotates areas of the plural rectangular objects specified by the determined positions, the determined sizes and the determined tilted angles by angles corresponding to the tilted angles, respectively.

Figure 6:
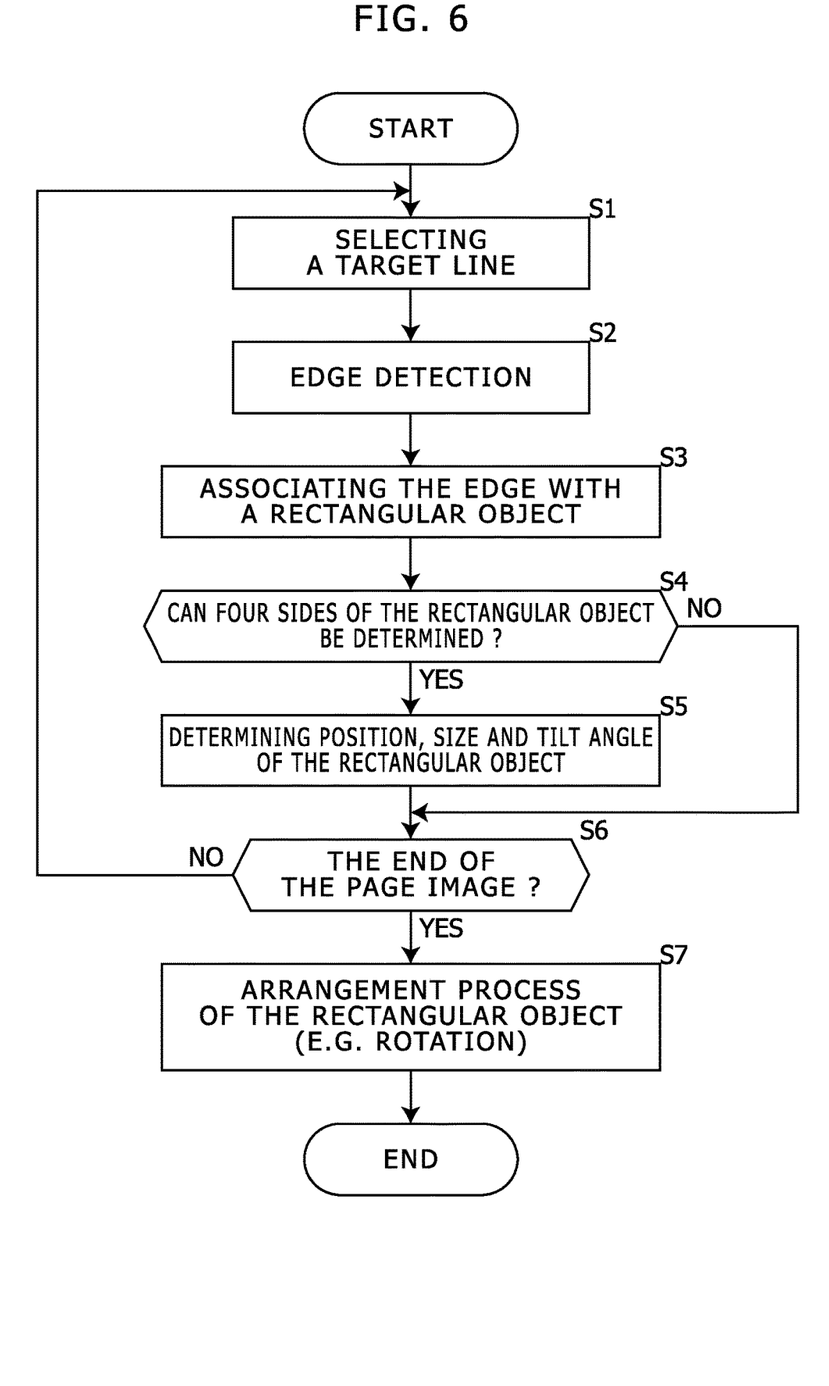
FIG. 6 shows a flowchart that explains a behavior of an image processing apparatus 14 shown in FIG. 1.

The following part explains a behavior of the aforementioned image processing apparatus 14. FIG. 6 shows a flowchart that explains a behavior of an image processing apparatus 14 shown in FIG. 1.

The control unit 31 obtains a page image and selects a target line in a predetermined order (in Step S1).

The edge detecting unit 32 searches each target line in the page image for edges of plural rectangular objects, and detects the edges of the plural objects on the target line on the basis of density variation between pixels in the target line (in Step S2).

The rectangular object detecting unit 33 determines a rectangular object that includes edges detected on the target line (i.e. the aforementioned two edges), and keeps the determined rectangular object and the detected edges so as to associate them with each other (in Step S3).

Here for each rectangular object, the rectangular object detecting unit 33 determines whether or not it is possible to determine four sides of the rectangular object on the basis of edges detected for this rectangular object until the current time (in Step S4); and for each rectangular object of which four sides can be determined, the rectangular object detecting unit 33 determines a position, a size and a tilt angle of the rectangular object (in Step S5). The rectangular object detecting unit 33 may skip over Steps S4 and S5 for a rectangular object of which a position, a size and a tilt angle have already been determined.

Subsequently, the control unit 31 determines whether selecting the target line reaches the end of the page image or not (in Step S6), and if selecting the target line does not reach the end of the page image, selects a next target line (in Step S1) and causes the edge detecting unit 32 and the rectangular detecting unit 33 to perform the aforementioned processes for the next target line (in Steps S2 to S5).

If selecting the target line reaches the end of the page image, for each rectangular object of which a position, a size and a tilt angle have been determined, the arrangement processing unit 34 rotates an area of the rectangular object by the tilt angle of this rectangular object (i.e. so as to change the tilt angle to zero) and thereby makes an upper side of the rectangular object parallel to the primary scanning direction (in Step S7).

As mentioned, in this Embodiment 1, the edge detecting unit 32 (a) searches each target line in a page image that includes plural rectangular objects for edges of the plural rectangular objects, and (b) detects the edges of the plural objects on the target line on the basis of density variation between pixels in the target line. The rectangular object detecting unit 33 (a) detects the plural rectangular objects on the basis of the detected edges, and (b) determines respective positions, respective sizes and respective tilt angles of the plural rectangular objects. The arrangement processing unit 34 rotates areas of the plural rectangular objects specified by the determined positions, the determined sizes and the determined tilted angles by angles corresponding to the tilted angles, respectively.

Consequently, even if plural rectangular objects are tilted by different tilt angles with each other in a page image, orientations of all the rectangular objects are corrected to a single constant orientation. In addition, the rectangular object is detected on the basis of a density distribution on a target line, and therefore, the detection of the rectangular object is achieved with a relatively simple process.

Embodiment 2

Figure 7:
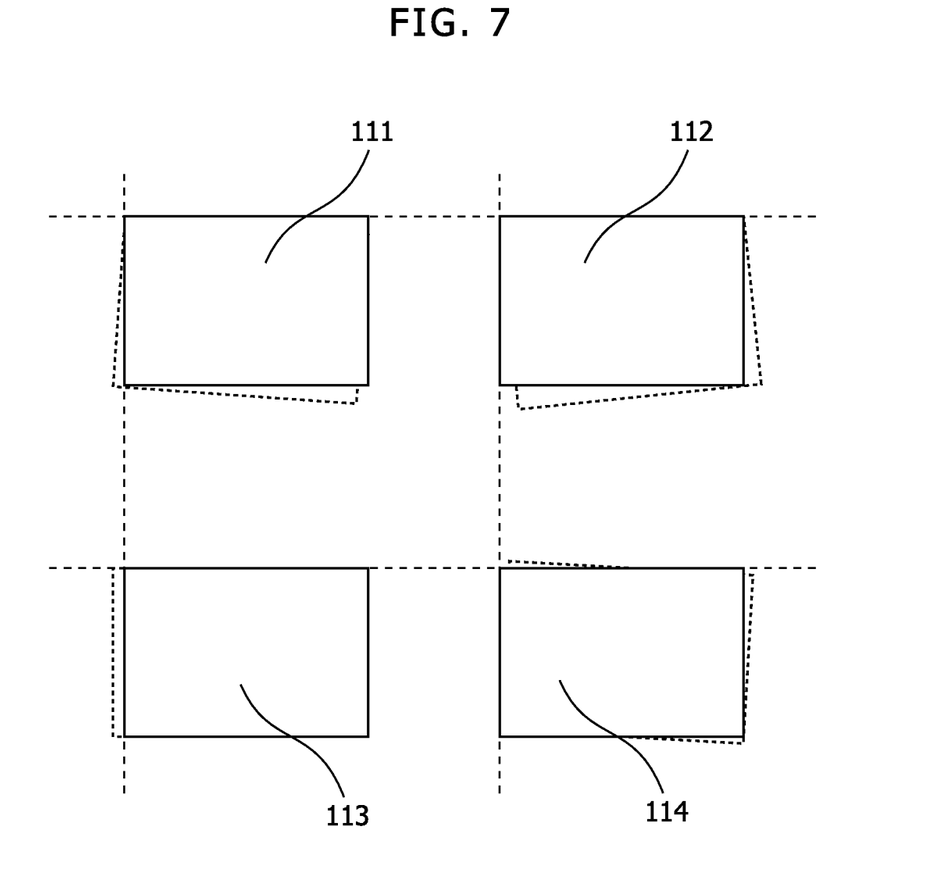
FIG. 7 shows a diagram that indicates an example of rectangular objects 111 to 114 (in FIG. 2) aligned by the image processing apparatus 14 according to Embodiment 2.

In Embodiment 2, the arrangement processing unit 34 (a) determines the numbers of the rectangular objects arranged along a primary scanning direction and along a secondary scanning direction, and (b) arranges the plural rectangular objects with regular intervals along the primary scanning direction and along the secondary scanning direction.

FIG. 7 shows a diagram that indicates an example of rectangular objects 111 to 114 (in FIG. 2) aligned by the image processing apparatus 14 according to Embodiment 2. In FIG. 7, the rectangular objects 111 to 114 before the alignment are indicated with broken lines and the rectangular objects 111 to 114 after the alignment are indicated with solid lines. As shown in FIG. 7, in Embodiment 2, the rectangular objects 111 to 114 are rotated when necessary, and further arranged with regular intervals in a primary scanning direction and a secondary scanning direction.

Other parts of the configuration and behaviors of the image processing apparatus 14 in Embodiment 2 are identical to those in Embodiment 1, and therefore, are not explained here.

Embodiment 3

Figure 8:
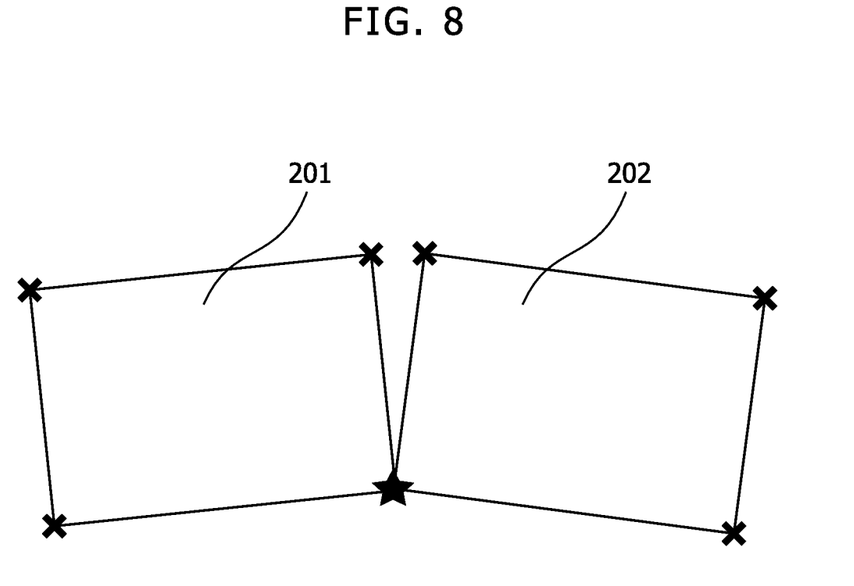
FIG. 8 shows a diagram that shows an example of two rectangular objects of which one partially overlaps with the other.
Figure 9:
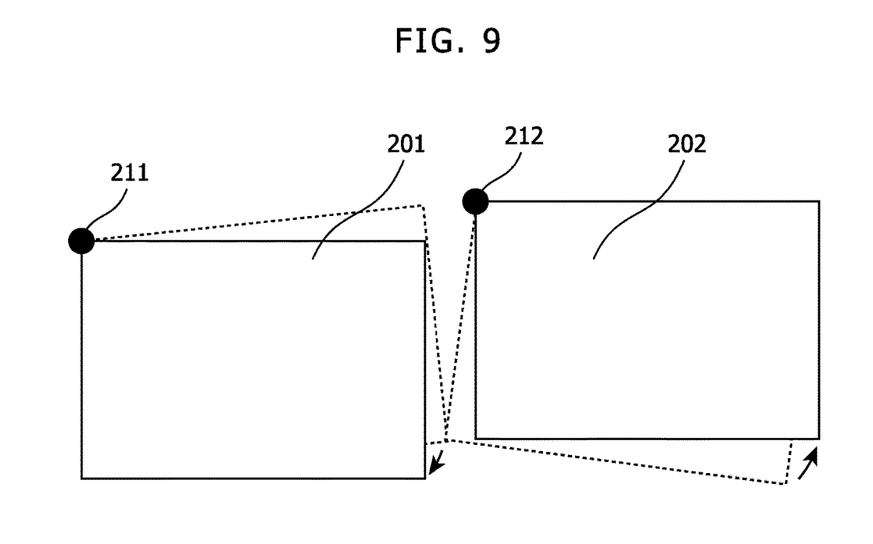
FIG. 9 shows a diagram that explains rotation of the rectangular objects shown in FIG. 8.

FIG. 8 shows a diagram that shows an example of two rectangular objects of which one partially overlaps with the other. FIG. 9 shows a diagram that explains rotation of the rectangular objects shown in FIG. 8.

In Embodiment 3, as shown in FIG. 8 for example, if one of two rectangular objects 201 and 202 among the plural rectangular objects partially overlap with the other of the two rectangular objects 201 and 202, the rectangular detecting unit 33 (a) separates the two rectangular objects 201 and 202 and (b) restores at least one of the separated two rectangular objects 201 and 202 to a rectangular shape by extrapolating a lacking part thereof. Further, when rotating the two rectangular objects 201 and 202, the arrangement processing unit 34 selects a rotation center of an area of each one of the two rectangular objects 201 and 202 from four vertexes of each one of the two rectangular objects 201 and 202 so as not to overlap areas of the two rectangular objects 201 and 202 after the rotation, as shown in FIG. 9, and rotates each one of the rectangular object 201 and 202 around the selected vertex 211 or 212 as a rotation center.

It should be noted that the overlap of the two rectangular objects 201 and 202 is detected, for example, on the basis of crossing each other between a straight line passing on a side of the rectangular object 201 and a straight line passing on a side of the rectangular object 202.

Other parts of the configuration and behaviors of the image processing apparatus 14 in Embodiment 3 are identical to those in Embodiment 1, and therefore, are not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiments, a vertex of the rectangular object may be chamfered by a straight line of a curved line. In such a case, intersection points of straight lines passing on the four sides are considered as the vertexes of areas of the rectangular object, and on the basis of these intersection points, the rotation of the rectangular object is performed.

What is claimed is:

1. An image processing apparatus, comprising:
   an edge detecting unit configured to (a) search each target line in a page image that includes plural rectangular objects for edges of the plural rectangular objects, and (b) detect the edges of the plural objects on the target line on the basis of density variation between pixels in the target line;
   a rectangular object detecting unit configured to (a) detect the plural rectangular objects on the basis of the detected edges, and (b) determine respective positions, respective sizes and respective tilt angles of the plural rectangular objects; and
   an arrangement processing unit configured to rotate areas of the plural rectangular objects specified by the determined positions, the determined sizes and the determined tilted angles by angles corresponding to the tilted angles, respectively, wherein the arrangement processing unit (a) determines the numbers of the rectangular objects arranged along a primary scanning direction and along a secondary scanning direction, and (b) arranges the plural rectangular objects with regular intervals along the primary scanning direction and along the secondary scanning direction.

2. An image processing apparatus, comprising:
   an edge detecting unit configured to (a) search each target line in a page image that includes plural rectangular objects for edges of the plural rectangular objects, and (b) detect the edges of the plural objects on the target line on the basis of density variation between pixels in the target line;
   a rectangular object detecting unit configured to (a) detect the plural rectangular objects on the basis of the detected edges, and (b) determine respective positions, respective sizes and respective tilt angles of the plural rectangular objects; and
   an arrangement processing unit configured to rotate areas of the plural rectangular objects specified by the determined positions, the determined sizes and the determined tilted angles by angles corresponding to the tilted angles, respectively, wherein for each target line in the page image, the rectangular object detecting unit (a) determines the number of the rectangular objects located on the target line on the basis of the number of the detected edges and determines the rectangular object that includes the edge on the basis of an order of the edges and the positions of the edges, and (b) tries to determine the position, the size and the tilt angle of each one of the rectangular objects on the basis of the positions of the edges included by each one of the rectangular objects.

3. An image processing apparatus, comprising:
an edge detecting unit configured to (a) search each target line in a page image that includes plural rectangular objects for edges of the plural rectangular objects, and (b) detect the edges of the plural objects on the target line on the basis of density variation between pixels in the target line;
a rectangular object detecting unit configured to (a) detect the plural rectangular objects on the basis of the detected edges, and (b) determine respective positions, respective sizes and respective tilt angles of the plural rectangular objects; and
an arrangement processing unit configured to rotate areas of the plural rectangular objects specified by the determined positions, the determined sizes and the determined tilted angles by angles corresponding to the tilted angles, respectively, wherein if one of two rectangular objects among the plural rectangular objects partially overlap with the other of the two rectangular objects, the rectangular detecting unit (a) separates the two rectangular objects and (b) restores at least one of the separated two rectangular objects to a rectangular shape.

4. The image processing apparatus according to claim 3, wherein when rotating the two rectangular objects, the arrangement processing unit selects a rotation center of an area of each one of the two rectangular objects from four vertexes of each one of the two rectangular objects so as not to overlap areas of the two rectangular objects after the rotation.

* * * * *